(12) United States Patent
Whitaker (10) Patent No.: US 9,184,805 B2
(45) Date of Patent: Nov. 10, 2015

(54) FRACTAL DIPOLE ANTENNA COMMUNICATION SYSTEMS AND RELATED METHODS AND USE

(71) Applicant: The United States of America as represented by the Secretary of the Navy, Crane, IN (US)

(72) Inventor: George Whitaker, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/467,623

(22) Filed: Aug. 25, 2014

(65) Prior Publication Data

US 2015/0131754 A1    May 14, 2015

Related U.S. Application Data

(60) Provisional application No. 61/881,640, filed on Sep. 24, 2013.

(51) Int. Cl.
| | |
|---|---|
| *H04B 7/02* | (2006.01) |
| *H04L 1/02* | (2006.01) |
| *H04B 7/04* | (2006.01) |
| *H01Q 1/36* | (2006.01) |
| *H04L 1/00* | (2006.01) |
| *H01Q 1/28* | (2006.01) |
| *H01Q 1/32* | (2006.01) |
| *H01Q 1/34* | (2006.01) |
| *H01Q 9/28* | (2006.01) |
| *H01Q 21/26* | (2006.01) |

(52) U.S. Cl.
CPC ............... *H04B 7/0404* (2013.01); *H01Q 1/28* (2013.01); *H01Q 1/32* (2013.01); *H01Q 1/34* (2013.01); *H01Q 1/36* (2013.01); *H01Q 9/28* (2013.01); *H01Q 21/26* (2013.01); *H04L 1/0009* (2013.01)

(58) Field of Classification Search
CPC ............. H01Q 1/36; H01Q 1/38; H01Q 1/28; H01Q 1/32; H01Q 1/34
USPC .......... 375/260, 267, 295, 316; 343/741, 793, 343/795, 820, 821, 700
See application file for complete search history.

(56) References Cited

U.S. PATENT DOCUMENTS 6,127,977 A * 10/2000 Cohen ................... 343/700 MS
6,300,914 B1 * 10/2001 Yang ............................ 343/741
(Continued)

*Primary Examiner* — Freshteh N Aghdam
(74) *Attorney, Agent, or Firm* — Christopher A. Monsey (57) ABSTRACT

A communication system and method for using a communication system is provided. An embodiment of an exemplary system can include different communication sets adapted to communicate with each other in different orientations/while moving in a highly secure manner. A first communications system embodiment can include a plurality of segmented fractal antennas and a communications data encoding and/or decoding system adapted to receive communication data and parse such communication data into groups or bins for transmission through an associated segment of the segmented fractal antennas. A second communication system embodiment of the invention has an identical or substantially identical segmented fractal as the first communication system embodiment's plurality of segmented fractal antennas and a communications data encoding and/or decoding system which receives signals sent by the first system and decodes received communications data.

32 Claims, 8 Drawing Sheets

Step 501: Providing a first system with 1) first multiple antennas with substantially identical segmented fractal dipoles including different segments with different orientations; and 2) a first communication encoding/decoding system adapted to parse transmitted data into data segments or bins matching the fractal dipole segments where frequencies of each fractal dipole segment are associated with the data segments or bins Step 502: Providing a second system with a second multiple antennas and communication system identical to said first antenna and first communication system Step 503: Communicating data from said first antenna to said second antenna

(56) References Cited

U.S. PATENT DOCUMENTS

| | | | | |
|---|---|---|---|---|
| 6,452,553 | B1* | 9/2002 | Cohen | 343/702 |
| 7,579,998 | B1* | 8/2009 | Fang et al. | 343/795 |
| 7,589,674 | B2* | 9/2009 | Anagnostou | H01Q 9/285 343/700 MS |
| 2006/0170604 | A1* | 8/2006 | Almog et al. | 343/795 |
| 2007/0126637 | A1* | 6/2007 | Habib | H01Q 1/36 343/700 MS |
| 2008/0001838 | A1* | 1/2008 | Huang | H01Q 9/285 343/795 |
| 2011/0063189 | A1* | 3/2011 | Cohen et al. | 343/899 |

\* cited by examiner

| Step 401 | Providing at least two systems with 1) multiple antennas with substantially indentical segmented fractals dipoles including different segments with different orientations; and 2) a communication encoding/decoding system adapted to parse transmitted data into segments or bins matching the fractal dipole segments |

| Step 402 | Communicating data between the antennas using the communication encoding/decoding system |

Fig. 4

| Step 501 | Providing a first system with 1) first multiple antennas with substantially indentical segmented fractal dipoles including different segments with different orientations; and 2) a first communication encoding/decoding system adapted to parse transmitted data into data segments or bins matching the fractal dipole segments where frequencies of each fractal dipole segment are associated with the data segments or bins |

| Step 502 | Providing a second system with a second multiple antennas and communication system identical to said first antenna and first communication system |

| Step 503 | Communicating data from said first antenna to said second antenna |

FRACTAL DIPOLE ANTENNA COMMUNICATION SYSTEMS AND RELATED METHODS AND USE

CROSS-REFERENCE TO RELATED APPLICATIONS

The present application claims priority to U.S. Provisional Patent Application Ser. No. 61/881,640, filed Sep. 24, 2013, entitled "FRACTAL DIPOLE ANTENNA," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 102,821) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates generally to antennas and, in particular, to fractal dipole antennas.

BACKGROUND OF THE INVENTION

A fractal dipole antenna is capable of transmitting and/or receiving multiple frequency bands simultaneously and of increasing bandwidth of each single band due to the fractal geometry. Shaping in a fractal manner can be achieved in several ways, such shapes including gaskets, carpets, patches, trees, curves, islands, etc. The fractal structure of the antenna gives rise to the electromagnetic behavior of the antenna. Embodiments of the invention could be used for a variety of applications e.g., unmanned aircraft vehicles (UAVs), ground teams, vehicles, ships, etc.

For example, fractal dipoles can be used when a secure, robust, and accurate short range data link is needed. Fractal dipoles can be used for sensor fusion, wherein numerous sensors such as IR detectors, radars, sonars, laser range finders, etc. transmit an IRIG timing signal, orientation data such as a pointing vector and the sensor data. In this example, this data can be a combination of digital and analog data.

Examples of different embodiments of the invention can be used for transmitting and receiving data are desirable as existing structures and methods of transmitting and receiving data can be unreliable or have undesirable effects. For example, laser systems require the lasers to be aligned with one another to communicate. When the laser communication is being used on ships, maintaining laser alignment is difficult and in many cases impossible as compared to use in fixed non-moving structures. Moreover, if a ship rotates more than 180 degrees, the lasers can lose connection absent another transmitter or receiver on another side of the turning ship (even this may not be effective). Furthermore, lasers require direct line of sight to communicate. When obstacles, such as other ships or inclement weather, are located between the lasers, an optical signal can be significantly degraded or blocked entirely.

Short range secure communications can be performed using several methods, each with their own advantages and disadvantages. Laser communications are effective in providing a good quality secure communications, but require expensive tracking and pointing equipment to keep the lasers aligned, and atmospheric conditions or obstructions such as another passing ship can disrupt the link. Satellite communications in general are somewhat effective but are not efficient for short range communication. However, satellite communication signals can also be obstructed by atmospheric conditions. Satellite communication up-links are relatively secure however their down links can be easily intercepted. Transceivers using Radio frequency (RF) spectrum frequently can be a good choice for short range for a variety of reasons such as RF is not severely affected by atmospheric conditions; however, RF signals can be easily jammed or intercepted. Thus, there is a need which has not been met to provide secure short range communication with a high data capacity which is not easily jammed or intercepted and is cost-effectively utilized with existing communication systems without requiring a significant degree of maintenance and can be mass produced.

Sensor fusion is an area of study that will greatly benefit from a secure robust short range communication system. To transmit or receive data, sensor fusion requires several items of information to be known: the pointing angle of the antenna, location of the antenna, time tag of the data received and other information. If the time of data being received at multiple locations is known, then one can use triangulation to identify the location and/or bearing of the signal. However, when in a test field where there is separation from the test equipment, one must have the exact time tag for data coming across so the data can be correlated and tagged for the proper location and time.

Communication systems in accordance with different embodiments of the invention can address the above mentioned unmet needs. For example, embodiments of the invention can incorporate use of multiple sets of fractal dipole antennas in different communication systems which are operable with significant movement, e.g., rotation, of both transmitter and receiver platforms, ability to address obstructions, address high speed data requirements, can be manufactured with low cost/high volume, usable with existing communication systems, and provide secure communications.

SUMMARY OF THE INVENTION

The invention includes a communication system including fractal dipole antennas and systems/methods of using them. An embodiment of an exemplary system can include different communication sets adapted to communicate with each other in different orientations/while moving in a highly secure manner. A first communications system embodiment can include a plurality of segmented fractal antennas and a communications data encoding and/or decoding system adapted to receive communication data and parse such communication data into groups or bins for transmission through an associated segment of the segmented fractal antennas. A second communication system embodiment of the invention has an identical or substantially identical segmented fractal as the first communication system embodiment's plurality of segmented fractal antennas and communications data encoding and/or decoding system which receives signals sent by the first system and decodes received communications data.

In one embodiment of an antenna according to the invention, an exemplary antenna comprises a first pair of oppositely directed arms extending along a first central axis, a second pair of oppositely directed arms extending along a second central axis, wherein said second central axis is orthogonal to said first central axis, and wherein at least a portion of each first and second pair of oppositely directed arms has a fractal geometric shape. In another embodiment, a method of secure communication comprises providing a first antenna including a first pair of oppositely directed arms extending along a first central axis, a second pair of oppositely directed arms extending along a second central axis, wherein said second central axis is orthogonal to said first central axis, and wherein at least a portion of each first and second pair of oppositely directed arms has a fractal geometric shape, providing a second antenna identical to said first antenna, and communicating data from said first antenna to said second antenna.

An exemplary communication scheme can also include an embodiment which associates segments of a transmitted or an encrypted/transmitted data stream with different segments of the fractal antennas is also provided. An exemplary communication scheme can also include an embodiment using a wavelet transform where the wavelet encryption produces different groups of data (e.g., octaves) which are then transmitted at different frequencies associated with respective segments of system using fractal antennas. An embodiment can also include a system which tracks relative position of receivers/transmitters and selectively transmit/receive using selected fractal antennas or even fractal antenna segments to transmit or receive based on which antennas and/or antenna segments are best aligned between a transmitter and receiver platform and antenna. An embodiment can also include a version which selectively uses specific fractal antenna(s) and/or antenna segment(s) based on additional factors such as position(s) of potential electronic signal interception threats e.g., switches off or attenuates segments of a fractal antenna that could couple with a potential interception receiver antenna in a parking lot of a shopping mall which a hacker could be using to attempt to intercept credit card transactions from a hand held barcode scanner coupled with a cash register terminal.

A communication system in accordance with the invention can include multiple sets of embodiments of the invention which are adapted to selectively couple with each other as different segments of the multiple fractal antennas substantially align with each other as platforms which the antennas are placed upon move. Alternate embodiments can also include a system which electronically or mechanically adjusts the fractal antennas to align with each other during movement. A switching system can also be used to switch between fractal antennas which are placed in different locations of a surface of a moving platform e.g., wings of an aircraft, a sail structure, a towed floating platform, or a remote antenna mount operated by, e.g., a remotely piloted system that is then coupled with a primary moving platform, are also alternative embodiments. Further embodiments, as well as features and advantages of the present invention, will become apparent herein.

BRIEF DESCRIPTION OF THE DRAWINGS

The above-mentioned and other disclosed features, and the manner of attaining them, will become more apparent and will be better understood by reference to the following description of disclosed embodiments taken in conjunction with the accompanying drawings, wherein.

DETAILED DESCRIPTION

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Embodiments according to the invention of an antenna, specifically an embodiment using fractal dipole antennas and methods of using an antenna and of secure communication are disclosed herein. For example, fractal antennas can be structured to transmit segments of data on different segments of the fractal dipoles. An embodiment of the invention can also include multiple fractal dipole antenna as being formed into each transmit/receive antenna which are structured to couple with another similarly structured dipole antenna transmitting simultaneously different groups of wavelet coefficients on many different frequencies, such that all the frequencies would have to be intercepted to receive all transmitted data signals. Also since the wavelet coefficients are being sent, not the actual data, a receiver would have to be programmed with the same wavelet basis function that was used to perform data encoding using a wavelet transform on transmitted data in order to recreate or decode the original data with an Inverse wavelet transform.

Systems using fractal dipole antennas in accordance with an embodiment of the invention allow for a short-range, high-speed, and secure communication system, which can be used on platforms which move substantially with relation to each other. Use of an embodiment of the invention is particularly desirable when transmitted data is sensitive, e.g. mobile banking systems, wearable electronics, aircraft based, ship based, or even for use in space communication systems. Data transmitted and received across fractal dipole antenna systems in accordance with an embodiment of the invention is secure as transmitted data, to intercept, would require the intercepting device to have a similar type of antenna as well as decoding systems capable of operating with antennas and encoding using an embodiment of the invention, e.g., a lifting algorithm to transform wavelet encoded data which has been segmented and allocated to different elements of a multiple and segmented fractal dipole antenna with different segments operating at different frequencies. In other words, among other things, the transmitted data is encrypted and to decrypt would require the intercepting device to utilize the same decryption key which is segmented according to the transmit/ receive antenna and has an antenna section which is in substantially the same orientation of another similarly designed antenna.

Data transmitted via wavelet data can be organized in bins associated with octave frequencies which can be associated with fractal patterns in antennas. For example, in a fractal antenna in accordance with an embodiment of the invention, each segment of the fractal antenna transmits or receives at different frequencies and the fractal pattern can be designed for octaves—e.g., half, double, etc. A wavelet transform of the wavelet data can then be transmitted using an exemplary antenna. An embodiment can address motion of a mounting platform using multiple dipole antennas. This can be accomplished, for example, by using two sets of antennas separated by a distance. When antennas are parallel, there is maximum coupling between the two antennas. When a platform rotates, antenna coupling begins decreasing at the cosine of the angle that each antenna is to each other. The angle is defined by the difference between the alignments of each antenna.

Furthermore, the curvature or form of fractal geometric shapes can provide an important benefit in an exemplary embodiment of the present invention. An exemplary embodiment can be designed to address harmonic effects which can alter or impact design or selection of a fractal shape which does not, for example, jam itself or create undesirable antenna behaviors that can reduce or negate benefits of using a fractal antenna in the first place.

Figure 1:
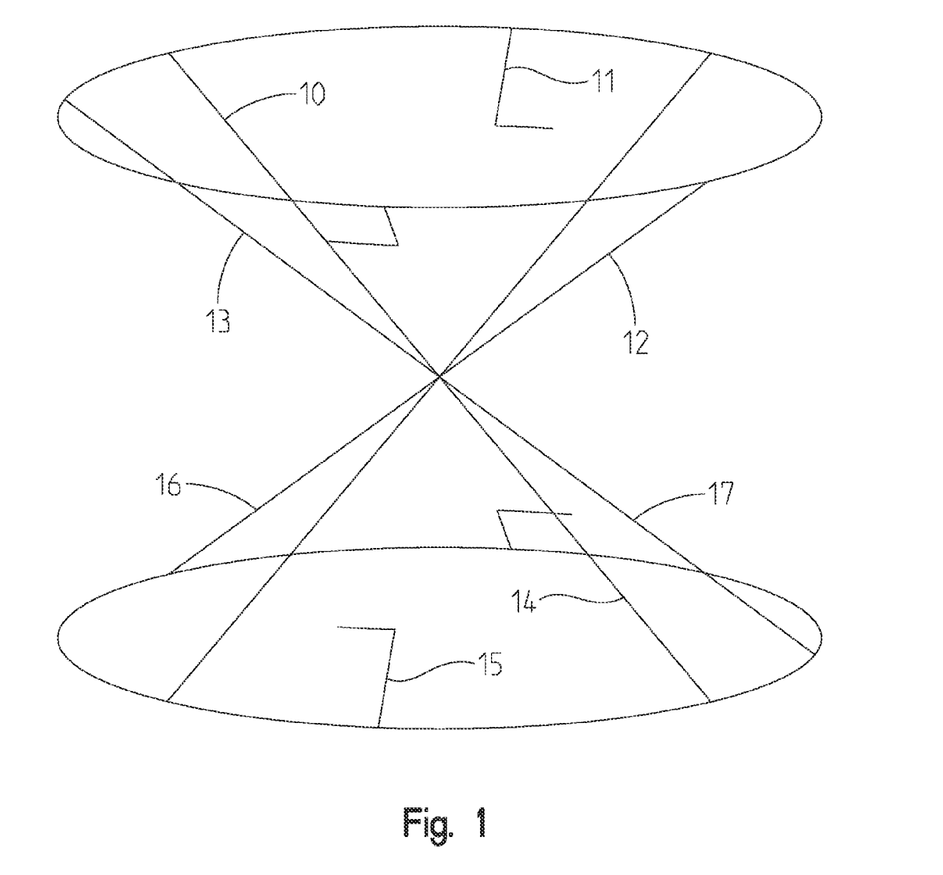
FIG. 1 shows a three-dimensional view of an exemplary embodiment using fractal dipole antenna structures.
Figure 2:
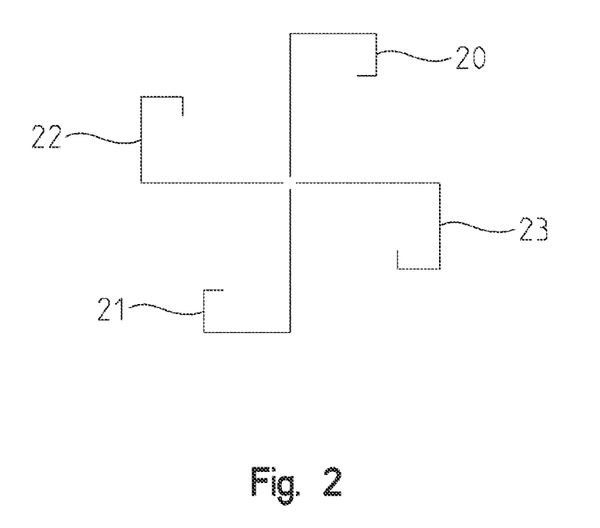
FIG. 2 shows a two-dimensional view of an exemplary embodiment using fractal dipole antenna structures.

FIG. 1 shows a three-dimensional view of an exemplary fractal dipole antenna. Pairs of antenna arms 11 and 13, 15 and 17, 19 and 21, and 23 and 25 are formed as fractal dipoles. FIG. 2 discussed below shows another embodiment of an exemplary fractal dipole antenna. A difference between exemplary three-dimensional and two-dimensional antennas is a number of planes. A third plane for three-dimensional embodiments requires a sum of square of all three planes to maintain a constant gain independent of angular orientation between the two antennas. Three-dimensional embodiments can provide additional benefits such as operability in an increasing number of orientations. Alternative embodiments can include adding synchronization of orientation to an encryption scheme to include a step or structure that orients the antennas substantially in symmetry to each other in different points of time or place to further provide secure communications capabilities. An alternative embodiment system can also selectively enable or alternate between specific antennas and orientations as a part of a security system.

FIG. 2 shows a two-dimensional view of an exemplary fractal dipole antenna. Exemplary pairs of arms 37 and 39, and 41 and 43 are fractal dipoles. Exemplary fractal dipoles are configured to be orthogonal. The FIG. 2 embodiment includes a first pair of oppositely directed arms 37 and 39 that are shown extending along a first central axis that is orthogonal to a second pair of oppositely directed arms 41 and 43 extending along a second axis. Additionally, at least a portion of each first and second pair of oppositely directed arms has a fractal geometric shape with multiple segments which are oriented differently to each other based on a desired transmit/receive relationship with another antenna designed in accordance with an embodiment of the invention.

Exemplary arms 37, 39, 41, and 43 have a fractal geometric shape. The exemplary fractal geometric shape allows for the antenna to transmit or receive at multiple frequencies simultaneously. Fractal antenna geometric shapes can vary geometrically, for example, square, gaskets, carpets, patches, trees, curves, islands, etc. A selected geometry for the illustration in FIG. 2 is a segmented spiral design. However, other embodiments may include other geometries or combination of geometries which are suitable for, e.g., moving platforms, transmission type (e.g., RF), antenna dependent encoding schemes, and/or security needs. This exemplary fractal geometry allows data to be divided across multiple frequencies simultaneously. Transmitting and receiving across multiple frequencies simultaneously allows for desired degrees of secure communication between the antennas. A second antenna in accordance with an embodiment of the invention that receives at the same frequencies as being transmitted can be used to receive all full data being communicated.

An embodiment of the invention includes segmented spiral fractals of the arms shown in FIG. 2 that are each are 90 degrees rotated from the other segmented spiral arms. Consider two exemplary antennas identical to the antenna of FIG. 2. When one antenna rotates, one segment or spiral of one arm will begin to go out of alignment losing gain with the cosine of the angle of rotation and another segment or spiral of a different arm will begin to come into alignment, increasing gain with the sine of the angle of rotation with respect to the segment or spirals of the second antenna. The exemplary antenna of FIG. 2 has four segmented spirals, each spiral having four segments. The four segments of each spiral are associated with different transmit and receive frequencies. Thus, this exemplary system enables rotation between two exemplary antennas. In other words, one segment spiral will lose coupling while another will gain coupling as rotation occurs. Summing the square of the output of the two different spirals will produce a constant gain independent of the orientation between the two antennas, i.e. $\sin\hat{\,}2+\cos^2=1$.

Exemplary embodiments of the invention can include design of fractal portions of antenna arms with harmonic effects in mind. A variety of design challenges were confronted when creating this invention. In other words, mere use of fractal antennas per se did not produce an operable system. For example, where the segments are bent at 90 degrees, there is less harmonic effect of coupling to other lines. A large amount of harmonic interference can result in poor or a lack of receivable data transmission. Efforts to reduce harmonic interference between fractal segments included designing a system where every bend was at ninety (90) degrees. Effort to address design challenges using, for example, fractal antennas resulted in new designs that in turn impacted frequency and data transmission quality over the overall antenna.

An orthogonal nature of exemplary fractal dipoles resulted in an embodiment that maintains a constant gain. For example, consider a second antenna which is identical to the antenna illustrated in FIG. 2. The second antenna, which also has exemplary orthogonal fractal dipoles, will maintain a constant gain. In this example, the constant gain is a result of the sum of the squared signals of the two orthogonal dipoles of the receiving antenna, wherein the signal of one of the receiving dipoles is equal to the cosine of the rotation angle between the transmitting and receiving antenna times the normalized gain at alignment and the orthogonally oriented receiving dipole gain is the sine of the rotation angle times the normalized gain at alignment. In other words, the gain is independent of the angular orientation of the exemplary antennas because $\mathrm{Sin}\hat{\,}2+\mathrm{Cos}^2=1$ which is normalized gain at alignment. So no matter what the alignment angle between the transmitting and receiving antennas gain will always be equal to normalized gain at alignment.

The exemplary fractal patterns of FIGS. 1 and 2 were optimized for a specific embodiment including application of transmitting wavelet coefficients; this is not the only fractal pattern considered, conceived, or reduced to practice. In the exemplary fractal pattern shown, each dipole segment is half the length of the preceding segment, resulting in a frequency tuned to twice the preceding segment. This exemplary geometric progression was chosen because wavelet coefficients are arranged in octaves where each frequency bin represents twice the frequency of the preceding bin and contains twice the number of coefficients. As the carrier frequency doubles, the amount of data it can transmit doubles. Each dipole half segment is separated from its corresponding other half segment by an even multiple of the wavelength of its tuned frequency. The physical size of the antenna is determined by the lowest frequency dipole component.

Figure 3:
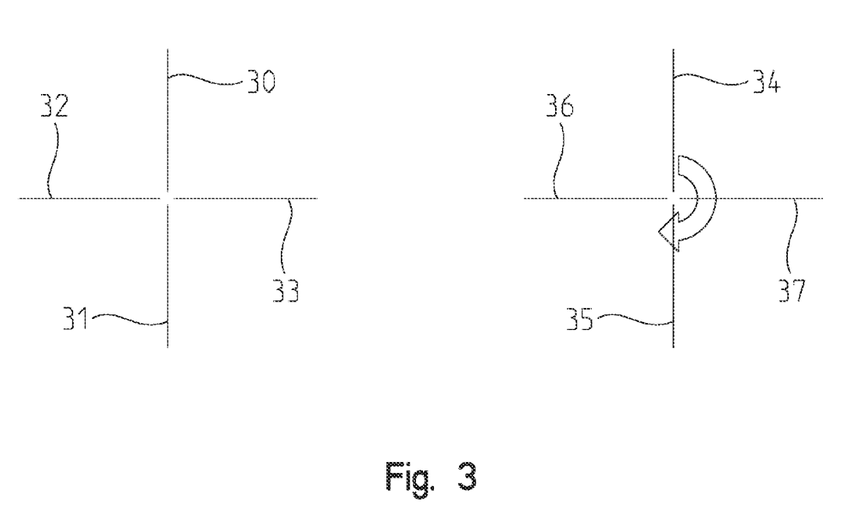
FIG. 3 shows a two-dimensional view of an exemplary fractal dipole antenna communication system, such that the fractal dipole antenna on the right is rotated 180 degrees.

FIG. 3 shows a two-dimensional view of an exemplary fractal dipole antenna communication system. In this example, a fractal dipole antenna on the right is rotated 180 degrees. Pairs of arms 53 and 55, 57 and 59, 61 and 63, and 65 and 67 are exemplary fractal dipoles. Arms 53, 55, 57, and 59 comprise a first antenna and arms 61, 63, 65, and 67 comprise a second antenna. The configuration and structure of the antennas allow for secure communication between the antennas. Due to the identical structure of the antennas, the antennas will transmit and receive at the same frequencies and be able to transmit and receive all of the data. Both antennas maintain a constant gain because of the structures of the antennas.

Data being transmitted or received using an exemplary embodiment of the invention can be encrypted or decrypted by a wavelet lifting function. Wavelet data can be subjected to a wavelet transform before it is sent or received. To use different frequencies with wavelets, a carrier frequency can be modulated with exemplary wavelet coefficients where the number of coefficients in each frequency bin increases by octaves—e.g., the first bin has one coefficient, the second bin has two coefficients, the third bin has four coefficients, the fourth bin has eight coefficients, etc. Each bin's associated coefficient doubles as it increases. An exemplary lifting algorithm or function is needed to encrypt or decrypt the data, which adds an extra layer of security for the communication between antennas.

An exemplary antenna can communicate exclusively with identically structured antennas. In order to receive the full data being communicated, an embodiment of a receiving antenna needs to receive across all the same frequencies as is being transmitted; if not, the receiving antenna will not receive all of the data being transmitted.

An exemplary antenna can be used to determine a bearing to and/or an estimate of a range of an identically structured antenna. For example, there are two different receiving dipoles orthogonal to each other on the receiving antenna, one could, for example, determine the bearing by calculating the normalized gain and the Sin and Cos angles derived from each received dipole. If sensor fusion is accomplished using this system the resulting information that could be gained includes accurate target bearing, velocity vectors location and radar cross section from different aspect angles.

To communicate, the above mentioned embodiments can include a signal processing system, a radio frequency transmitter, a radio frequency receiver, etc. The fractal ends of the dipoles have segments that transmit and/or receive at different frequencies, which is a result of the lengths of the segments.

Another feature of the embodiments discussed above includes reorienting a first antenna, or the arms of a first antenna, in relation to a second antenna. Another embodiment includes antenna segments that can alter length and position of the fractal segments in order to add additional security in addition to accounting for relative motion of transmitter and receivers. Another alternate embodiment can also coordinate orientation position among all systems using one of the antenna systems as a reference which other antenna systems mirror. Another alternate embodiment includes an antenna that does not transmit wavelets but uses a different encoding scheme that can be broken up into different segments and transmitted simultaneously. A control system can position/orient an antenna, note the position with a sensor system, and then transmit such antenna position/orientation to other transmit/receive antennas so other antennas can coordinate or synchronize their position. Another embodiment, such as with wearable systems, can detect orientation/position of an antenna and communicate such position/orientation information to other antenna systems so such systems can selectively engage different antennas in accordance with embodiments of the invention (e.g., another antenna which is either worn by another person or a non-wearable system which reorients in order to interact with a wearable antenna). Mobile (e.g. smartphones) or wearable personal computing systems can also be designed to operate using an embodiment of this invention.

Figure 4:
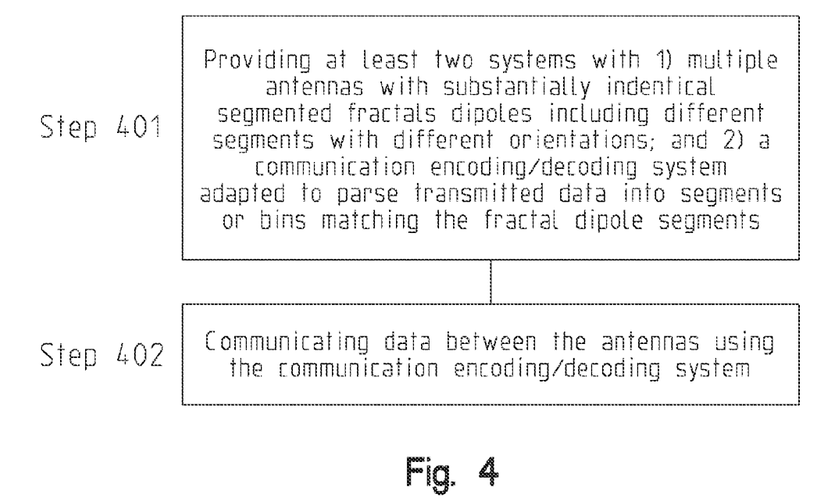
FIG. 4 shows a flow chart for an exemplary method of using an antenna.

FIG. 4 shows a flow chart for an exemplary method of using an antenna. A first step 401 in using an exemplary antenna is to provide an antenna designed in accordance with an embodiment of the invention. An exemplary antenna can have a first pair oppositely directed arms and a second pair of oppositely directed arms, where the first and second pair of oppositely directed arms are orthogonal to each other. At a second step 402, communicate data with an identically structured antenna designed in accordance with one embodiment of the invention. Communication data can be encrypted or decrypted using, for example, a wavelet lifting function. The communication data can also be transmitted and received across multiple frequencies simultaneously. Communication data can be transmitted across multiple frequencies by parsing the communication data and sending only pieces across each frequency and then when received piece the communication data back together. This exemplary embodiment allows for a secure communication from transmitting antenna to receiving antenna. As part of the exemplary method, constant gain can be maintained independent of angular orientation of an identically structured antenna constructed according to one embodiment of the invention. An exemplary method can further include determining a direction and/or an estimate of a range of an identically structured antenna. The direction and range can be determined by geometric formulas, orientation of the arms, fractal geometry of the arms, etc.

Figure 5:
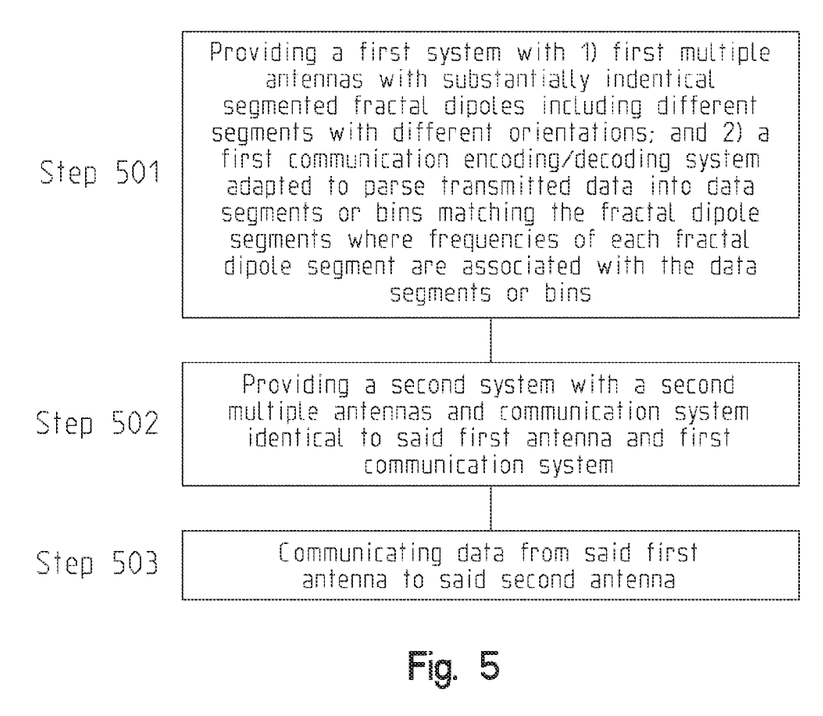
FIG. 5 shows a flow chart for an exemplary method of secure communication.

FIG. 5 shows a flow chart for an exemplary method of secure communication. A first step 501 includes providing a first multiple antenna constructed in accordance with an embodiment of the invention. An exemplary antenna can have a first pair oppositely directed arms and a second pair of oppositely directed arms, where the first and second pair of oppositely directed arms are orthogonal to each other. A second step 502 includes providing a second multiple antenna identical to the first antenna. A third step 503 includes communicating data first from the first multiple antenna to the second multiple antenna. Communication data can be encrypted or decrypted using a wavelet lifting function. Communication data can also be transmitted and received across multiple frequencies simultaneously via different segments of an exemplary antenna constructed in accordance with one embodiment of the invention, e.g., first or second antennas. Communication data can be transmitted across multiple frequencies by parsing the communication data and sending only pieces of such data across each frequency and then when received piece the communication data back together. This embodiment allows for a secure communication from transmitting antenna to receiving antenna. As part of the exemplary method, constant gain can be maintained independent of angular orientation of an identically structured antenna designed in accordance with one embodiment of the invention. An exemplary method can further include determining a direction and/or an estimate of a range of an identically structured antenna. The direction and range can be determined by geometric formulas, orientation of the arms, fractal geometry of the arms, etc. An alternative embodiment can also include a system which sends different sensors output via different communication data segments or bins which are in turn associated with different segments of an exemplary fractal antenna segment.

Figure 6:
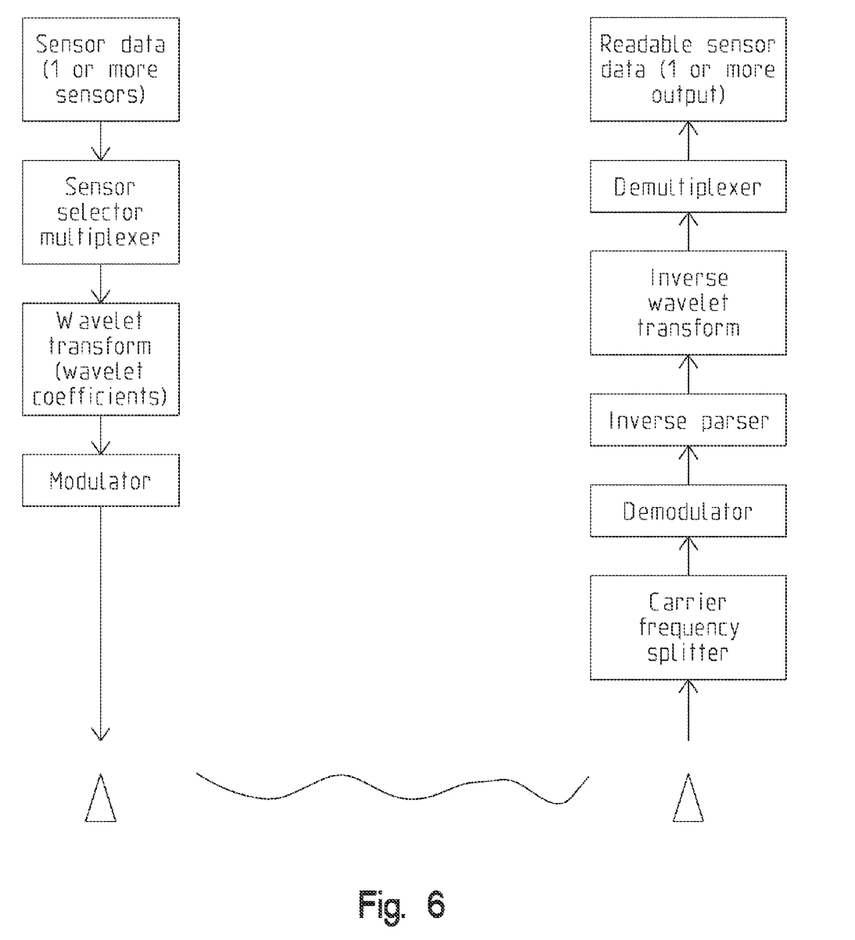
FIG. 6 shows a block diagram of an exemplary use of wavelets for encryption.
Figure 7A:
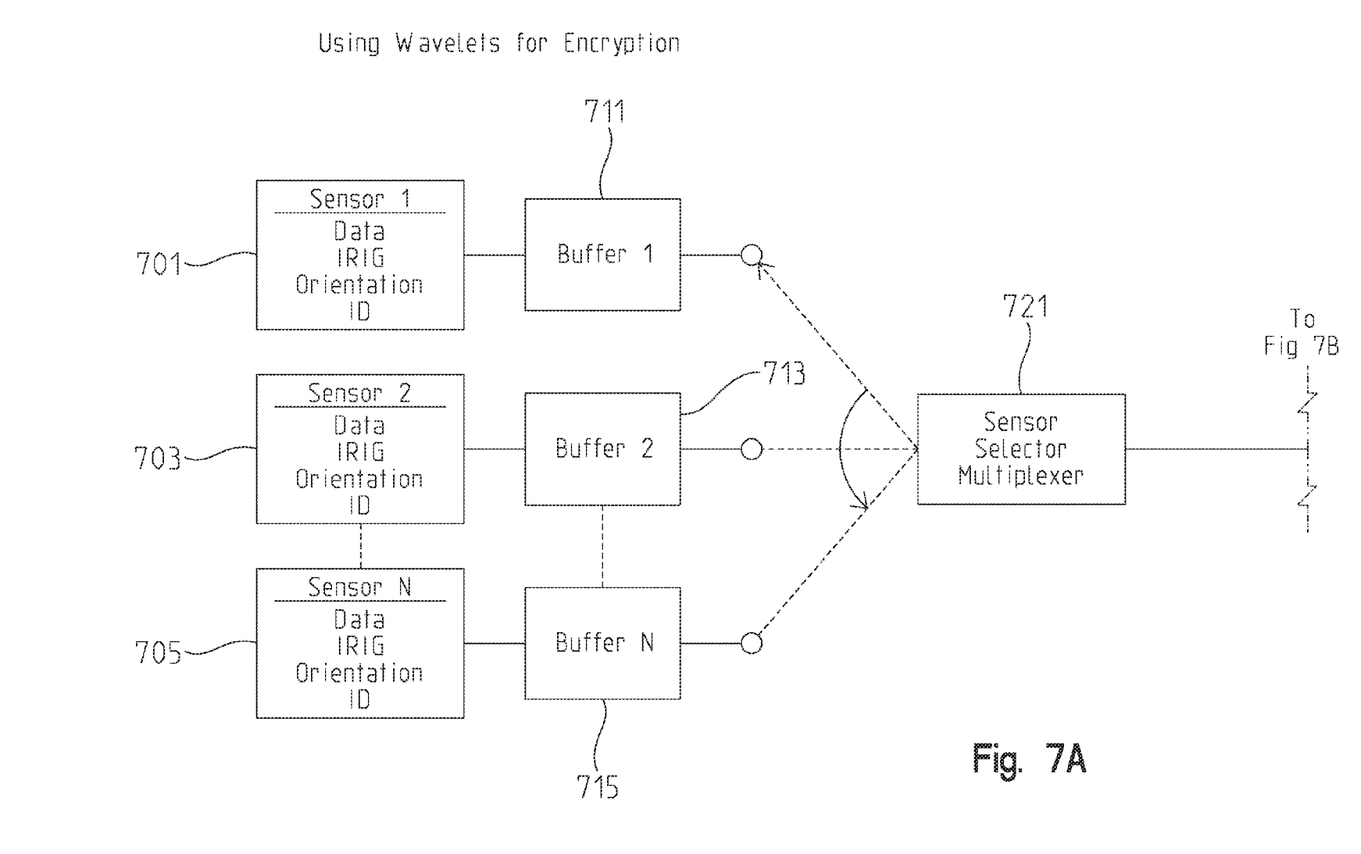
FIGS. 7A, 7B, 7C, and 7D show a block diagram of an exemplary system using wavelets and encryption.
Figure 7B:
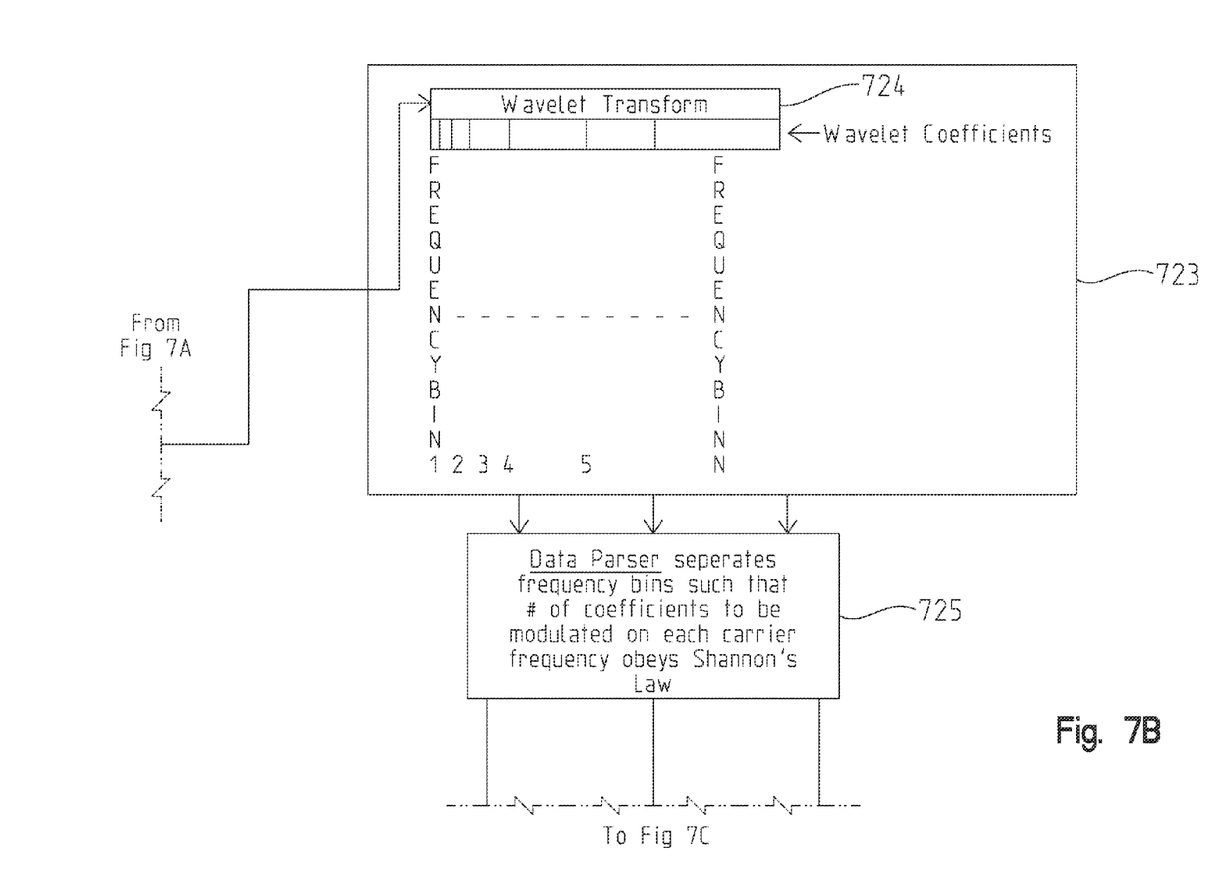
Figure 7C:
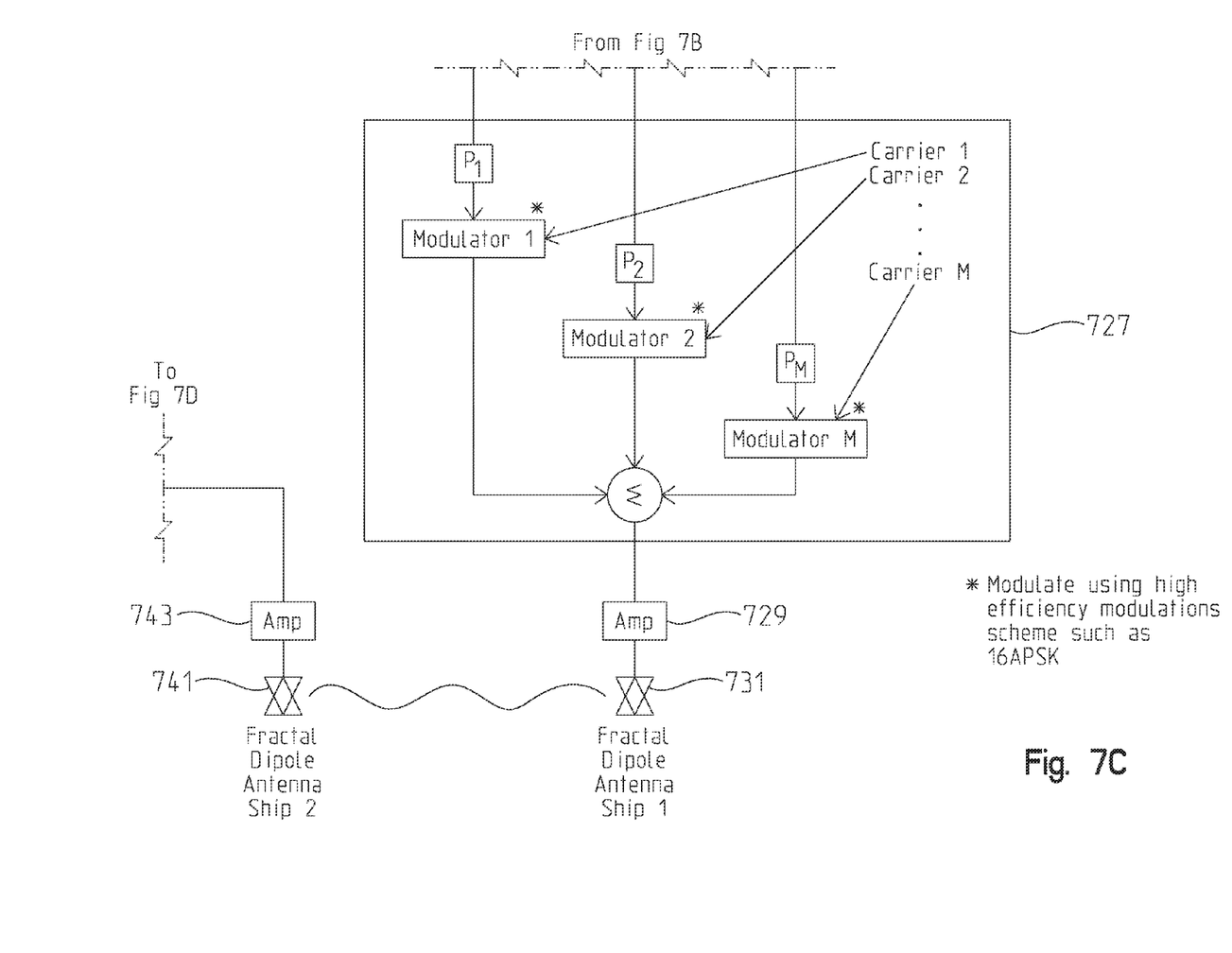
Figure 7D:
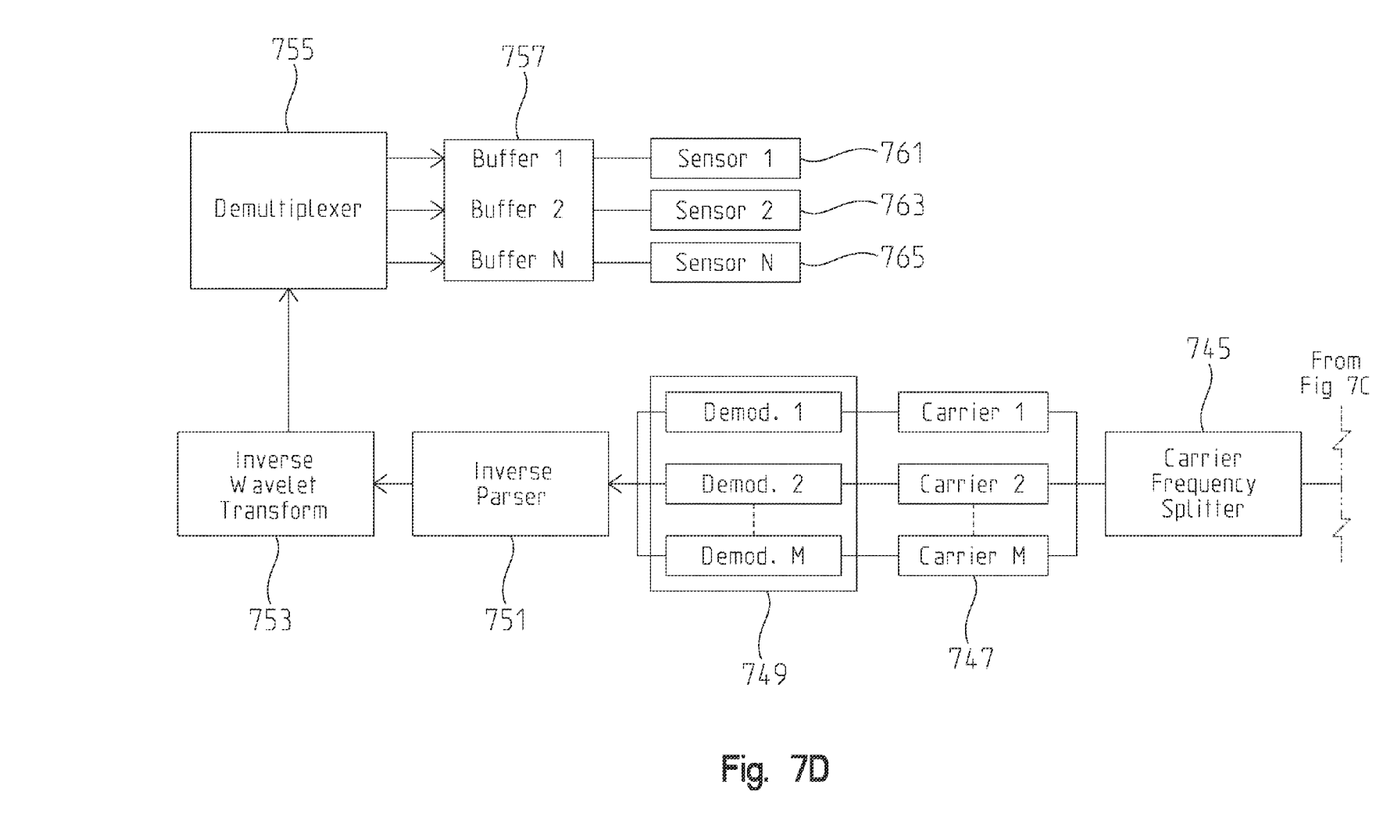

FIG. 6 shows a block diagram of an exemplary use of wavelets for encryption showing two separated sets of related systems that are communicating with each other in accordance with an embodiment of the invention. In a first system set shown and described herein in a connected sequence of blocks from top to bottom, a first block includes Sensor data (1 or more sensors). The first block is coupled with a second block. The second block includes a sensor selector multiplexer. The second block is coupled with a third block which includes a wavelet transform (wavelet coefficients). The third block is coupled with a fourth block which includes a modulator. The fourth block is coupled with an exemplary first antenna. A second system set shown and described herein from bottom to top in a connected sequence of functional blocks includes an exemplary second antenna in accordance with an embodiment of the invention which is coupled to a carrier frequency splitter block. The carrier frequency splitter block is coupled to a demodulator. The demodulator block is coupled with an inverse parser block. The inverse parser block is coupled with an inverse wavelet transform block. The inverse wavelet transform block is coupled with a demultiplexer block which is in turn coupled with a block representing a readable sensor data output block.

Another feature of one embodiment is a use of wavelet transforms for encryption and inverse wavelet transforms for decryption. When using wavelets for encryption, an exemplary communication system performs several steps. Data from a sensor is sent to a sensor selector multiplexer where combined data is sent into a wavelet transform function which can use wavelet coefficients. The wavelet transform parses sensor data and separates frequency bins such that the number of coefficients to be modulated on each carrier frequency obeys Shannon's Law. Modulators are used to modulate the data, which is then transmitted.

Embodiments of the invention using inverse wavelet transforms can be used for decryption of communication data. Upon receiving wavelet transformed data, several steps can occur. The communication data is received into a carrier frequency splitter. Received communication data is demodulated. The data then goes through inverse parsing, inverse wavelet transform, and sent to the demultiplexer. After demultiplexer operation, received data is rendered usable by a user.

In other embodiments, an exemplary method of processing communication data includes acquiring communication data from various sensors. The sensor data is tagged with, e.g., Inter Range Instrumentation Group (IRIG) e.g., (time tags), orientation/position/location, sensor identification (ID), etc. The sensor data is then stored in a predetermined length of each sensor data with tags in buffer. The sensor data is then selected in turn with a multiplexer. The wavelet transform is performed with selected buffer data. The wavelet coefficients are parsed out by frequency bins or multiple bins keeping in mind an amount of data to be transmitted in each parsed segment doesn't exceed Shannon's Law for each carrier frequency. Each parsed group of coefficients is then modulated by the octave carrier frequencies that match the design of the fractal dipole antenna. Such modulation schemes used are highly efficient schemes such as a sixteen point constellation amplitude phase shift keying (APSK). The carriers are then summed. The resulting data is run through a wideband power amp for transmission and transmitted through a fractal dipole antenna.

In an exemplary embodiment, data is then received through a matching fractal dipole antenna. The received signal is amplified. The sum of different receiving fractal dipoles in accordance with an embodiment of the invention are squared to obtain normalized or constant signal with respect to angular orientation. The data is run through a filter bank to separate different carriers. The received signal is demodulated. The received demodulated signal is inverse parsed to recreate wavelet coefficients in correct order. An inverse wavelet transform is performed on the resulting coefficients. A demulitplexer filters data into separate sensor buffers. The resulting sensor data is then separated from the sensor tag data. Then the resulting data is provided to a computer to post process with sensor data from other platforms or systems, e.g., ships.

FIGS. 7A, 7B, 7C, and 7D show a block diagram of an exemplary system using wavelets and encryption. A number of information or sensor systems (e.g., sensor, data or information sources) 701, 703, 705, with a variety of data outputs (e.g., data, IRIG, orientation, ID, etc) output their data outputs into a respective data buffer 711, 713, 715 which are output into a sensor selector multiplexer 721. The sensor selector multiplexer 721 is coupled to a demultiplexer 723 as well as to a wavelet transform system/section 724 adapted to perform wavelet transforms on data coming out of the sensor selector multiplexer 721. Wavelet data is passed out of the wavelet transform system/section 724 to a data parser 725 which separates data and associates it into frequency bins such that a number of coefficients to be modulated on each carrier frequency of segments of a first fractal dipole antenna 731 which obeys Shannon's Law. Output from the data parser 725 is provided to a modulation system 727 which receives multiple bin data on carrier frequency input lines or data structures which are each modulated then passed into a section (e.g., summing circuit or section) which outputs to an amplifier 729. Amplifier 729 output is then sent to the first fractal dipole antenna 731 which transmits from a first platform (e.g., ship 1) to a second fractal dipole antenna 741 mounted on a recipient platform (e.g., ship 2). The second fractal dipole antenna 741 receives various signals from the first fractal dipole antenna 731 and passes it to an amplifier 743 that outputs to a carrier frequency splitter 745. The carrier frequency splitter 745 splits received signals from the amplifier 743 into separate data feeds 747 that are in turn separately input into a series of respective demodulation sections 749. The demodulation sections 749 in turn output separate demodulated signal feeds into an inverse parser 751 which in turn outputs data into an inverse wavelet transform section 753. The inverse wavelet transform section 753 then outputs into a demultiplexer/selector 755 that in turn feeds into separate buffers associated with different sensors correlating to the information or sensor sources 701, 703, 705 from an originating platform (e.g., ship 1). Display systems (not shown) then can create a sensor fusion display (not shown) to combine multiple platform data feeds for a combined or selectively combined data or sensor information display system (such as a combination of sensor feeds from multiple platforms combined into a single common operating picture with some or all of data originating on different platforms). The illustrated system in FIGS. 7A, 7B, 7C, and 7D show a system in a process going from a first to a second platform e.g., ship 1 to ship 2. However, this system can work in reverse as well as work with many different platforms in a many to many, one to many, many to one relationship. Thus, the FIGS. 7A, 7B, 7C, and 7D illustrative embodiment should not be taken to be a limiting description but a simplified description used to illustrate a process and system used in one mode of its potential embodiments. For example, the same system which is used to perform inverse parsing 751 and inverse wavelet transforms 753 can be adapted to perform data parsing (e.g., data parser 725) and wavelet transforms (wavelet transform system/section 723). The modulation system 727 from ship 1 can also be adapted to perform demodulation and carrier splitting functions such as in carrier frequency splitter 745, 747, 749, etc.

An exemplary communication scheme can also include an embodiment which associates segments of a transmitted or an encrypted/transmitted data stream with different segments of the fractal antennas is also provided. An exemplary communication scheme can also include an embodiment using a wavelet transform where the wavelet encryption produces different groups of data (e.g., octaves) which are then transmitted at different frequencies associated with respective segments of system using fractal antennas. An embodiment can also include a system which tracks relative position of receivers/transmitters and selectively transmit/receive using selected fractal antennas or even fractal antenna segments to transmit or receive based on which antennas and/or antenna segments are best aligned between a transmitter and receiver platform and antenna. An embodiment can also include a version which selectively uses specific fractal antenna(s) and/or antenna segment(s) based on additional factors such as position of potential electronic signal interception threats e.g., switches off or attenuates segments of a fractal antenna that could couple with a potential interception receiver antenna in a parking lot of a shopping mall which a hacker could be using to attempt to intercept credit card transactions from a hand held barcode scanner coupled with a cash register terminal.

A communication system in accordance with the invention can include multiple sets of embodiments of the invention which are adapted to selectively couple with each other as different segments of the multiple fractal antennas substantially align with each other as platforms which the antennas are placed upon move. Alternate embodiments can also include a system which electronically or mechanically adjusts the fractal antennas to align with each other during movement. A switching system can also be used to switch between fractal antennas which are placed in different locations of a surface of a moving platform e.g., wings of an aircraft, a sail structure, a towed floating platform, or a remote antenna mount operated by, e.g., a remotely piloted system that is then coupled with a primary moving platform, are also alternative embodiments.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A communication system comprising:
first and second fractal antennas spaced apart from each other, said first and second fractal antennas are each configured to be coupled to separate transmitter and receiver systems adapted configured to respectively supply or receive first and second radio frequency signals to said first and second fractal antennas, said first and second fractal antennas each comprising:
a first pair of oppositely directed arms extending along a first central axis; and
a second pair of oppositely directed arms extending along a second central axis, wherein said second central axis is orthogonal to said first central axis;
first and second communications data encoding or decoding systems configured to separately receive a first and second communication data respectively from said first and second fractal antennas and parse said first and second communication data into groups or bins;
wherein at least a portion of each said first and second pairs of oppositely directed arms is formed into a respective fractal geometric shape;
wherein each of said first and second fractal antennas are oriented in a different orientation from each other;
wherein each said arms are segmented to form said respective fractal geometric shape;
wherein each of said groups or bins are determined based on one or more transmission characteristic of each of said arm segments.

2. The communication system of claim 1, wherein each of said groups or bins are determined by said communication data encoding or decoding system based on transmission characteristic of each of said arm segments, wherein said communication data encoding or decoding system includes a section operable to output each of said groups or bins for transmission to respective said arm segments.

3. The communication system of claim 1, wherein said encoding system comprises a wavelet lifting function.

4. The communication system of claim 1, wherein said first and second fractal antennas each further comprises a third pair of oppositely directed arms extending along a third central axis, wherein said third central axis is orthogonal to said first central axis and said second central axis, wherein at least a portion of said third pair of oppositely directed arms is formed into a respective fractal geometric shape.

5. The communication system of claim 1, wherein said respective fractal geometric shape comprises a segmented spiral.

6. The communication system of claim 1, wherein said first and second pairs of oppositely directed arms are configured to transmit and receive across multiple frequencies simultaneously.

7. The communication system of claim 1, wherein said first and second fractal antennas are further configured to communicate exclusively with one or more identically structured said first and second fractal antennas.

8. The communication system of claim 7, wherein said first and second communication data is divided across multiple frequencies.

9. The communication system of claim 1, further comprising first and second post processing sections respectively coupled to said first and second communication data encoding/decoding systems configured to maintain constant gain of said radio frequency signal independent of angular orientation of an substantially same or identically structured transmitting or receiving antenna including said first and second fractal antennas, said post processing section receives an electrical output from each said pair of oppositely directed arms, squares the electrical output from each said pair of oppositely directed arms, and then sums the squared result from each said oppositely directed arms to maintain said constant gain.

10. The communication system of claim 1, wherein said communication system is further configured to determine a direction of an identically structured antenna based on transmission from one said pair in said first said fractal antenna and receiving by all said pairs in said second fractal antenna and post processing of an electrical output from said second fractal antenna based on determining a difference of gain in each of said pairs of second fractal antenna.

11. The communication system of claim 9, wherein said communication system is further configured to determine an estimate of a range of an identically structured antenna based on a range look-up table data or a range calculation based on a single known range.

12. A method of using a communication system comprising:
providing a first antenna system comprising:
a first pair of oppositely directed arms extending along a first central axis;
a second pair of oppositely directed arms extending along a second central axis, wherein said second central axis is orthogonal to said first central axis;
communicating data with a second antenna system comprising an identically structured antenna to said first antenna system, said data is parsed into different data segments where each said different segments are transmitted and received by different identically shaped said pairs of oppositely directed arms.

13. The method of claim 12, wherein at least a portion of each said first and second pairs of oppositely directed arms has a fractal geometric shape, said method further comprising encrypting or decrypting communicated data associated with each said different data segments by a wavelet lifting function.

14. The method of claim 12, wherein communicating data is transmitted and received across multiple frequencies simultaneously respectively by each antenna segment defined by each arm of said pairs, wherein each antenna segment is formed differently than at least one other said antenna segments.

15. The method of claim 12, further comprising maintaining constant gain independent of angular orientation of an identically structured transmitting or receiving antenna by post receiving an electrical output from each said pair of oppositely directed arms, squaring the electrical output from each said pair of oppositely directed arms, and then summing the squared result from each said oppositely directed arms to maintain said constant gain.

16. The method of claim 12, further comprising determining a direction of said identically structured antenna.

17. The method of claim 12, further comprising determining an estimate of a range of said identically structured antenna.

18. The method of claim 12, wherein said antenna selectively transmits or receives from variably chosen portions of said antenna to or from variably chosen portions of said identically structured antenna.

19. A method of secure communication comprising:
providing a first antenna comprising:
a first pair of oppositely directed arms extending along a first central axis;
a second pair of oppositely directed arms extending along a second central axis, wherein said second central axis is orthogonal to said first central axis; and
wherein at least a portion of each of said first and second pairs of oppositely directed arms has a fractal geometric shape;
providing a second antenna identical to said first antenna; and
communicating data from said first antenna to said second antenna.

20. The method of claim 19, further comprising encrypting communication data by a wavelet lifting function.

21. The method of claim 19, wherein encrypting communication data further comprises sequentially:
combining the communication data from sensors by using a selector multiplexer;
attaching wavelet coefficients to said communication data;
parsing the communication data;
separating said communication data into frequency bins; and
modulating the communication data.

22. The method of claim 19, further comprising decrypting communication data by an inverse wavelet lifting function.

23. The method of claim 22, wherein encrypting communication data further comprises sequentially:
processing the communication data through a carrier frequency splitter;
demodulating the communication data;
processing the communication data through an inverse parser;
processing the communication data through an inverse wavelet transform; and
separating the communication data through a demultiplexer.

24. The method of claim 19, wherein communicating data is transmitted or received across multiple frequencies simultaneously.

25. The method of claim 19, further comprising maintaining constant gain independent of angular orientation of first and second antennas.

26. The method of claim 19, further comprising determining a direction of said second antenna.

27. The method of claim 19, further comprising determining an estimate of a range of said second antenna.

28. The method of claim 19, wherein said first and second antennas utilize a signal processing system.

29. The method of claim 19, wherein said first and second antennas utilize a radio frequency transmitter or receiver.

30. The method of claim 19, wherein said first and second antennas are variably positioned with respect to each other.

31. The method of claim 19, wherein said first antenna or said second antenna transmits or receives data from variably chosen portions of said first antenna or said second antenna based upon received data originating from outside the communication system.

32. The method of claim 19, wherein encrypting communication data further comprises sequentially:
combining the communication data from sensors by using a selector multiplexer;
attaching wavelet coefficients to said communication data;
parsing the communication data to separate said communication data into frequency bins; and
modulating the communication data.

* * * * *